July 21, 1953

B. F. QUINTILIAN 2,646,223

ICE SHAVING MACHINE

Filed April 1, 1950

INVENTOR
BARTHOLOMEW FRANK QUINTILIAN.

BY Howard J. Whelan

ATTORNEY

July 21, 1953  B. F. QUINTILIAN  2,646,223
ICE SHAVING MACHINE
Filed April 1, 1950  5 Sheets-Sheet 2

INVENTOR
BARTHOLOMEW FRANK QUINTILIAN.

BY Howard J. Whelan,
ATTORNEY

July 21, 1953　　B. F. QUINTILIAN　　2,646,223
ICE SHAVING MACHINE
Filed April 1, 1950　　5 Sheets-Sheet 3
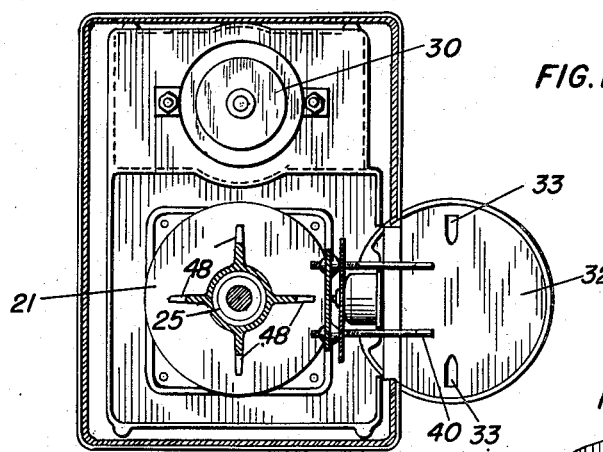
FIG. 13.
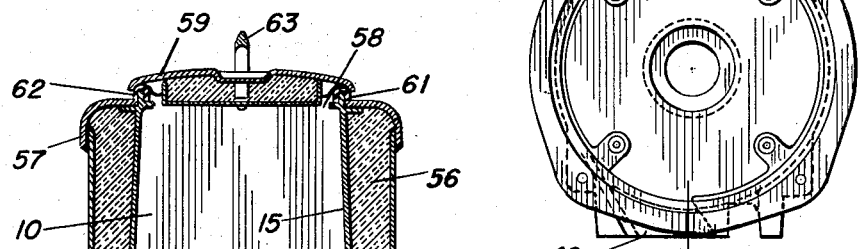
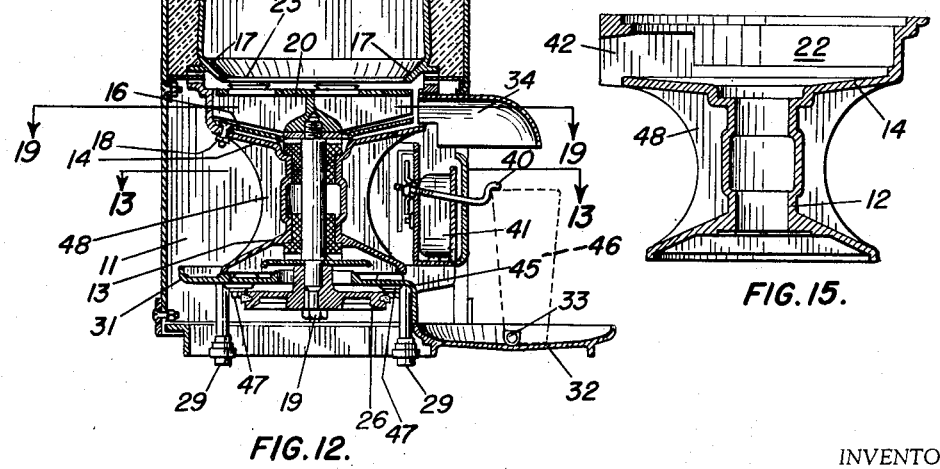
FIG. 12.　FIG. 14.　FIG. 15.
INVENTOR
BARTHOLOMEW FRANK QUINTILIAN.
BY Howard J. Whelan.
ATTORNEY July 21, 1953  B. F. QUINTILIAN  2,646,223
ICE SHAVING MACHINE
Filed April 1, 1950  5 Sheets-Sheet 4

INVENTOR
BARTHOLOMEW FRANK QUINTILIAN.

BY *Howard J. Whelan*
ATTORNEY

July 21, 1953     B. F. QUINTILIAN     2,646,223
ICE SHAVING MACHINE
Filed April 1, 1950     5 Sheets-Sheet 5
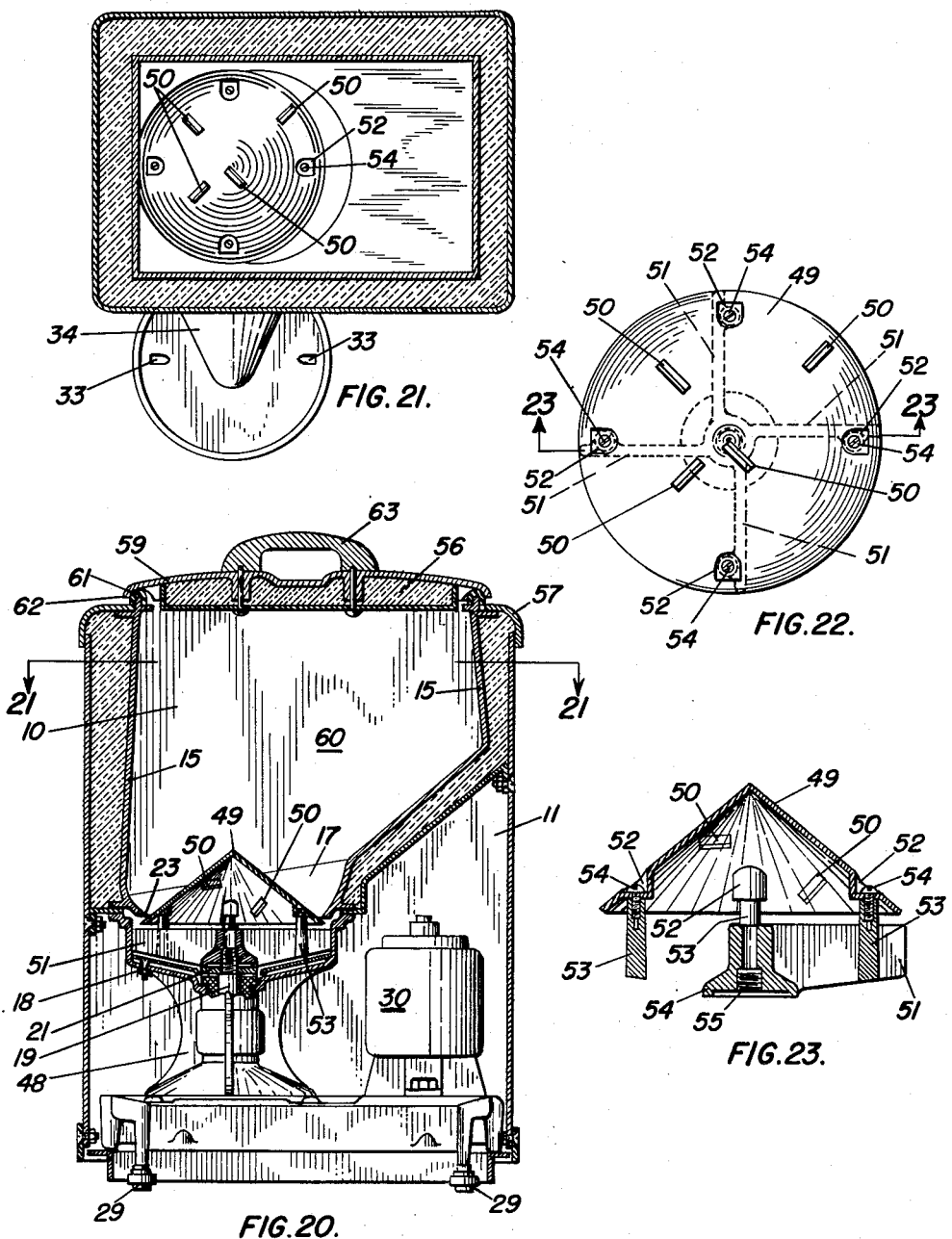
INVENTOR.
BARTHOLOMEW FRANK QUINTILIAN.
BY Howard J. Whelan.
ATTORNEY.

Patented July 21, 1953

2,646,223

UNITED STATES PATENT OFFICE 2,646,223

ICE SHAVING MACHINE

Bartholomew Frank Quintilian, Baltimore, Md., assignor to QSK Products Inc., a corporation of Maryland Application April 1, 1950, Serial No. 153,409

5 Claims. (Cl. 241—92)

This invention relates to ice handling and conversion equipment and more particularly to an ice paring or shaving machine.

In the conventional types of ice shaving machines, the location of the knives employed is such that they do not completely use up the ice block or pieces that are loaded into it for the purpose. Further the water evolving from the ice is not allowed to escape so that it mixes with the shaven ice and makes it mushy and soft. Also the construction of the machine is such that the ice loading has to be done at the top and requires special efforts and time to let it down in the reservoir, and the method is relatively dangerous. The pieces cut from the blocks of ice fall down from the knives to an outlet below, which renders them hard to get at as well as include the watering that has already been referred to. Barriers are frequently required for the guidance and holding the pieces of ice against rotation with the blades and sooner or later they prove objectionable from a mechanical and maintenance standpoint.

In this invention, the apparatus, without involving any additional structure to complicate its assembly or operation, is designed to shave the ice blocks placed in it, and completely disintegrate them not excluding the central portion of each block, while at the same time draining off the excess water, away from the shaven product so that the latter will not be wetted or contaminated by it. It also removes the excess water and makes use of its lack of heat to cool and lubricate the power mechanism of the device to eliminate the use of oil. It includes serrated knives and their operation is so arranged that no restraint is required to hold the ice-block adequately for paring it.

It is therefore an object of this invention to provide a new and improved ice-paring machine that will avoid one or more of the disadvantages and limitations of the previous art.

Another object of the invention is to provide a new and improved ice-paring machine that can adequately pare an ice-block inserted into its reservoir, in a uniform manner without requiring barriers or other restraints to hold it stationary, while the paring is being done.

A further object of the herein described invention is to provide a new and improved paring machine for ice that will effectively drain off excess water involved therein, and employ it for cooling and lubricating the moving parts of the machine.

Other objects will become apparent as the invention is more fully set forth.

For a fuller explanation of the invention, its objects and mode of operation, reference is made to the accompanying drawings. These drawings in conjunction with the following description illustrate a particular form of the invention, by way of example, while the claims emphasize the scope of the invention.

Referring to the drawings, in which:

Figure 12 is a sectional view on line 12—12 of Figure 6;

Figure 13 is a sectional plan on line 13—13 of Figure 12;

Figure 14 is a plan view of base used in this embodiment;

Figure 15 is a sectional elevation on line 15—15 of Figure 14;

Figure 20 is a sectional elevation of a modified form of conical cutter head;

Figure 21 is a section on line 21—21 of Figure 20;

Figure 22 is an enlarged view of the conical cutter head; and

Figure 23 is a section along line 23—23 of Figure 22.

Similar reference numerals refer to similar parts throughout the drawings.

Figure 2:
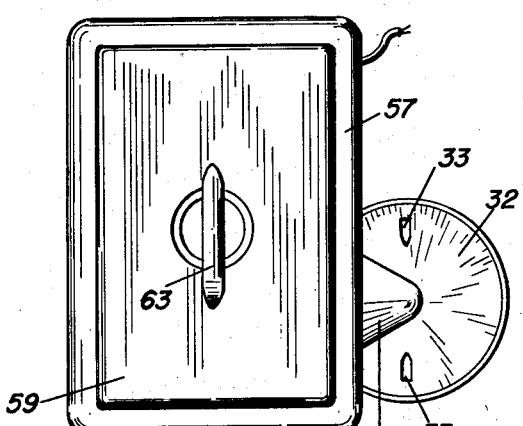
Figure 2 is a plan view of Figure 1.
Figure 3:
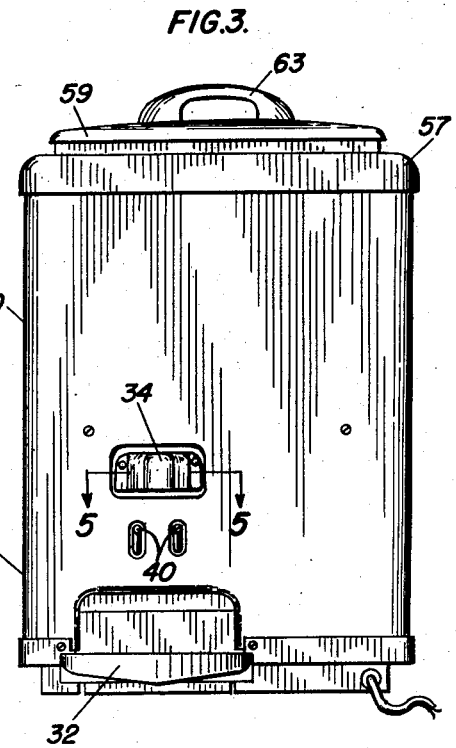
Figure 3 is a front elevation of Figure 1.
Figure 1:
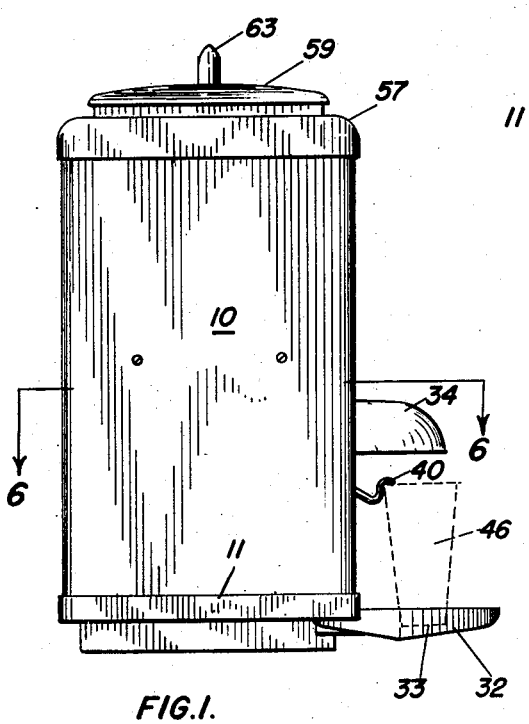
Figure 1 is a side elevation of an ice paring machine embodying this invention.
Figure 4:
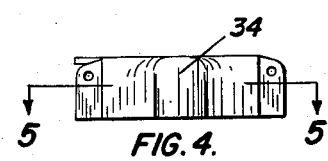
Figure 4 is an enlarged detail of the spout used in this embodiment.
Figure 5:
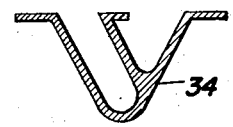
Figure 5 is a sectional view on line 5—5 of Figure 4.
Figure 6:
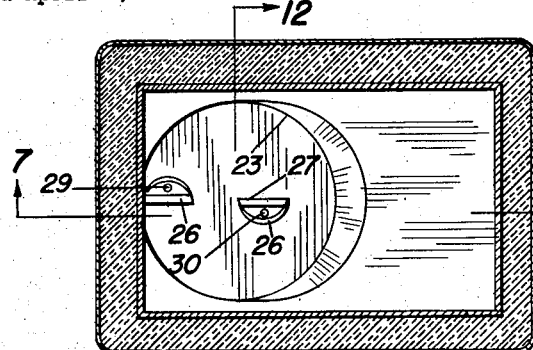
Figure 6 is a sectional view on line 6—6 of Figure 1.
Figure 8:
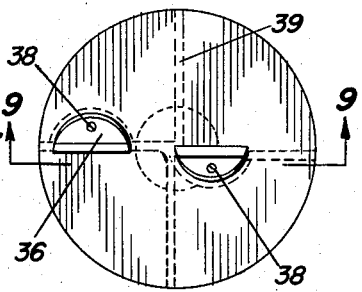
Figure 8 is a detail of the cutter plate used in this device.
Figure 9:
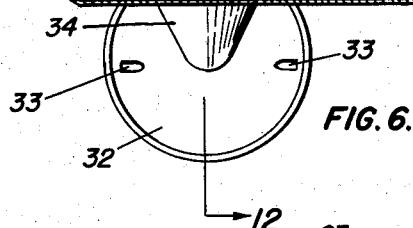
Figure 9 is a sectional view of the cutter on line 9—9 of Figure 8.
Figure 7:
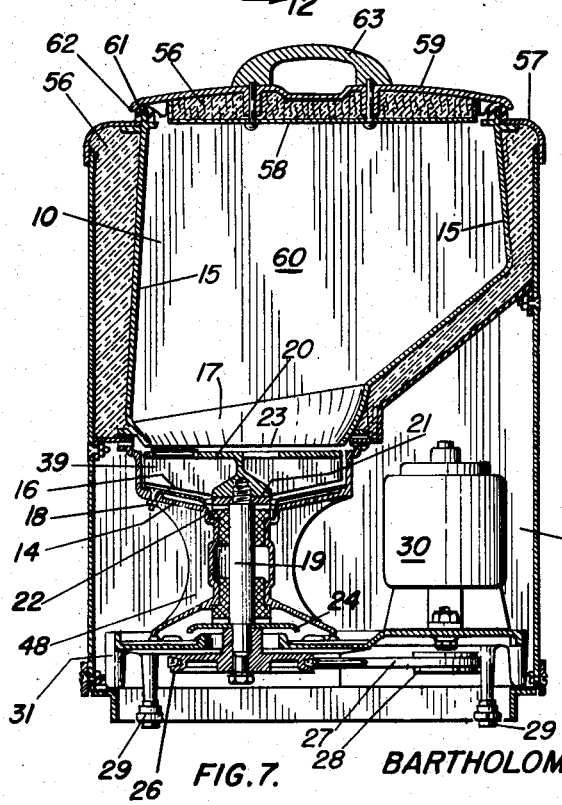
Figure 7 is a sectional view on line 7—7 of Figure 6.
Figure 10:
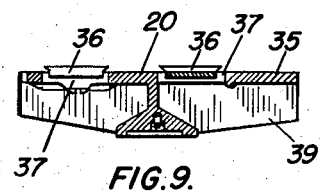
Figure 10 is a plan view of the pulley.
Figure 11:
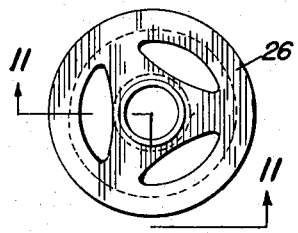
Figure 11 is a view on line 11—11 of Figure 10.
Figure 16:
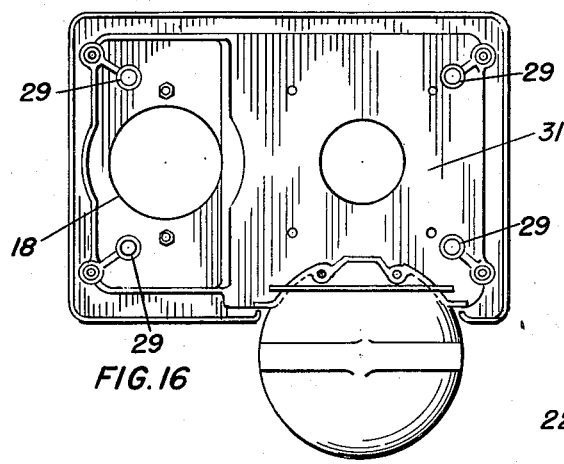
Figure 16 is a view of the underside of the tray used.
Figure 19:
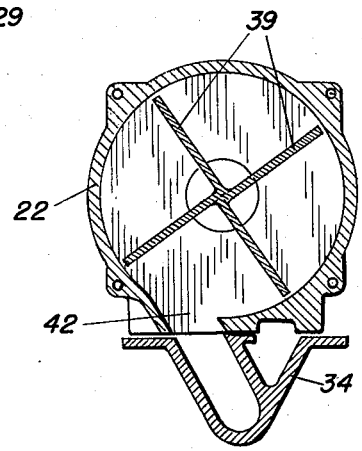
Figure 19 is a sectional view on line 19—19 of Figure 12.
Figure 17:
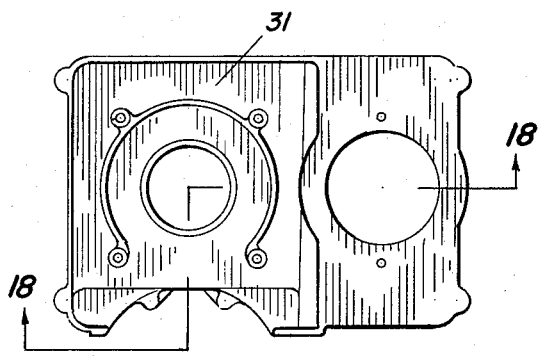
Figure 17 is a detail of the top of the tray.
Figure 18:
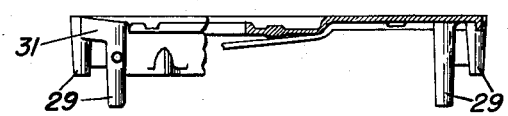
Figure 18 is a section along line 18—18 of Figure 17.

The construction shown in the drawings consists of an ice paring machine, which includes a housing of quasi-rectangular form vertically and horizontally. It is divided into two sections, upper and lower, designated at 10 and 11. The upper section is termed the reservoir, and has an inner wall 15 spaced from its outside wall enough to permit the placement of a filler of insulating material 56. The top portion of the housing section 10 is closed over as indicated in Fig. 12 by a cap 57, which is formed with an aperture 58 through which ice is inserted into the reservoir space 60. The aperture is closed by an insulated cover 59 resting on a gasket 61 provided at the rim 62 of the aperture. It is manipulated by a handle 63 provided in it. The wall 15 of the reservoir is tapered slightly, generally, enlarging the space 60 towards the bottom of the reservoir. The walls 15 taper downwardly and outwardly to prevent the ice in its downward movement from compacting and jamming as is the case when the walls are straight. This conical effect allows the ice to pass from a small area and allows the ice to spread and prevent compacting and jamming. The bottom 23 of the reservoir is open and is pan shaped with the sides 17 thereof bevelled inwardly. This is to guide the ice away from the walls of the reservoir towards the aperture 23 as it reaches the knives. Part of the wall 15 is formed as indicated in Figure 7 to enable the ice to be placed in the reservoir in a more convenient manner, rather than requiring that it be dropped bodily into it.

The lower section 11, contains the mechanical and motive parts of the machine. Under the open bottom 23 is situated the cutter supporting frame 22 which is designed preferably with four webs 48 formed as indicated. It has a central column 12 hollowed to receive and hold a spindle 19 rotating on a vertical axis when in operation. The bearings 13 in this column are perforated to allow the ice water from the ice to work itself through to the bearings. The frame has an upper shelf 14 tapering towards the center of axial area. An auxiliary plate 16 also tapers toward the center of axial area so as to guide the water to the bearings. It is fastened to the shelf 14 by screws 18 leaving however a small spacing in between as an air insulator. The spindle 19 is stepped or shouldered to facilitate the positioning of the cutter head 20 on its uppermost section, resting on a collar 21 below it. Likewise, at the bottom section of the spindle a collar 24 extends radially under the corresponding shoulder and rotatably rests on a hub 25 of the pulley wheel 26. This pulley is rotated by the belt 27 actuated by the pulley 28 of a motor 30. The motor is located in the section 11 to the side of the frame 22. The frame 22 is fastened to the tray 31 by bolts 47 which form supporting posts for the whole housing, and extend underneath as indicated for this purpose. The frame 22 leads to the tray 31 underneath it to collect the ice water running down through its bearings 13 and sends the excess to the front to run into the sink 32 to be drained off through a pipe 33 attached thereto.

The lower section 11 includes a downwardly pointed spout 34 extending from its peripheral wall led from the space above auxiliary plate 16 and the frame upper shelf 14 and in line with the face of the cutter head 20. The cutter head 20 has a shaving plate 35 mounted on it in which recesses 37 of semi-circular contour are provided for the adjustable semi-circular knives or blades 36 to project. The knives are made adjustable by their fastening screws 38, and the amount adjusted defines the amount or depth of paring that will be shaved off. The knives 36 are so placed that they overlap in their cutting areas, so as to cover the whole surface underneath of the block of ice placed in the reservoir. The shaving plate 35 is strengthened by the webs 39 underneath and which also serve to sweep the shaved ice along with them. When the cutter head 20 is running, the shaving of the ice in contact with the cutter knives 36 is done quickly, as the shaven product is carried by centrifugal force to the peripheral area of the auxiliary plate 16 and swept through the spout 34 into the container 46 placed in the sink 32 to receive it. The container raises the switch handle 40 when it is placed on the sink and automatically starts the controls 41 of the motor 30, so it drives the cutter head 20. Moving the container reverses the action and the motor stops.

The water from the ice drops continually into the frame 22 and cools it, its bearings and the spindle 19, accomplishing as it does so the lubrication of the bearings and the removal of the water from the shaven product. The edges of the knives are preferably serrated to make them cut the ice finer and in smaller width. The motor 30 is in the lower section 11 so it can be handled more conveniently, while at the same time be kept away from the ice and water developed in the machine. The frame 22 has the orifice 42 provided in its peripheral wall to allow the passage of the shaven ice at the level of the shelf 14. Another opening is provided in the wall of the lower section 11 for the ice-water and drippings to pass through out of the housing into the sink 32. The tray 31 catches this water as it passes through the frame and bearings and leads it over a lip 45 to the sink. As the section 11 has its components cooled by the ice water and the reservoir of ice above it, its cooling effects are also felt by the motor 30 and tends to keep that running cool at all times and increases its efficiency. The cutter head 20 is threaded to receive the threaded head of the spindle 19.

In Figures 20, 21, 22 and 23 are shown a modified cutter head of the conical form 49 with cutters 50 positioned thereon for cutting and shaving the ice placed in the reservoir 60. The conical cutter head is provided with indentations 52 for attachment to posts 53 by screws 54. The posts 53 are formed on webs 51 mounted on the hub 54' which is attached to the spindle 19 by its threaded portion 55. One of the advantages of the conical cutter head is its increased cutter area for the same diameter head of the flat type, in addition to its providing cutting surface from the outer edge to the center axis and producing a higher ice shaving or paring capacity at the same rate of speed. The open area directly below the cone provides better diffusion of the semi-dry ice and the underside 55 of the cutter head 49 acts as a centrifuge to drive the water away from the shaved ice by centrifugal force during its rotation. Before the cone starts spinning the normal water from the melting ice runs down the face of the cone and keeps the unshaved or pared ice dry. The water from the cone passes through the bearings in the manner outlined above. The legs 29 support the machine.

While but two general forms of the invention are shown in the drawings and described in the specifications, it is not desired to limit this application to these particular forms, as it is appreciated that other forms of construction could

Having thus described the invention what is claimed is:

1. An ice shaving machine comprising a vertically disposed container having an upper and a lower compartment, the inner walls of the upper compartment being slanted to guide and insure gravitational downward movement of ice pieces placed in said compartment, an open-ended pan at the bottom of the upper compartment having side walls tapering towards the lower compartment, a vertical frame in the lower compartment, said frame having an axial passage therethrough, spaced hollow bearing elements mounted in said passage, a rotary shaft supported in said bearings, a cutter secured to said shaft at the upper end thereof and positioned at the bottom end of the upper compartment, said frame having a dished upper portion with a central opening and with walls tapering towards the aforesaid axial passage to direct the drippings gathered by the dished portion of the frame through its opening and through the axial passage to the bearings to cool them, and a motor in the lower compartment for driving the aforesaid shaft.

2. An ice shaving machine as set forth in claim 1, wherein the cutter consists of a plurality of blades spaced at different distances from the axis of the shaft whereby the blades sweep over staggered paths during their rotation.

3. An ice shaving machine as set forth in claim 1, wherein said frame has a radial passage for discharging ice shaved by the cutter, a spout carried by the container in alignment with said passage, and means beneath said spout operated by the positioning of a glass beneath the spout for controlling the motor.

4. An ice shaving machine as set forth in claim 1, wherein said frame has a radial passage for discharging ice shaved by the cutter, a spout carried by the container and aligned with said passage, a sink carried by the container in vertical alignment with said spout, and a tray in the lower compartment beneath said frame to receive the cooling water past the bearings, the overflow from said tray falling in said sink.

5. An ice shaving machine as set forth in claim 1, said cutter being of cone shape with the apex extending within the upper compartment, a series of cutting blades carried on the faces of said cutter, said cutter having peripheral indentations, securing posts extending in said indentations and means for mounting said posts on the aforementioned frame.

BARTHOLOMEW FRANK QUINTILIAN.

References Cited in the file of this patent

UNITED STATES PATENTS

| Number | Name | Date |
|---|---|---|
| Re. 20,952 | Smith | Dec. 20, 1938 |
| 377,365 | Wharton | Jan. 31, 1888 |
| 525,195 | Egner | Aug. 28, 1894 |
| 1,072,193 | Symons | Sept. 2, 1913 |
| 1,172,558 | Rickert | Feb. 22, 1916 |
| 1,333,094 | Reed | Mar. 9, 1920 |
| 1,449,917 | Shaw et al. | Mar. 27, 1923 |
| 2,033,903 | Smith | Mar. 10, 1936 |
| 2,181,000 | Shively | Nov. 21, 1939 |
| 2,393,017 | Boyd et al. | Jan. 15, 1946 |
| 2,397,124 | Buffington | Mar. 26, 1946 |